United States Patent
Chu et al.

(10) Patent No.: US 11,866,632 B2
(45) Date of Patent: Jan. 9, 2024

(54) LIQUID-CRYSTAL POLYMER, LAMINATED MATERIAL, LIQUID-CRYSTAL POLYMER SOLUTION, AND METHOD OF FORMING LIQUID-CRYSTAL POLYMER FILM

(71) Applicant: INDUSTRIAL TECHNOLOGY RESEARCH INSTITUTE, Hsinchu (TW)

(72) Inventors: Yu-Lin Chu, New Taipei (TW); Jen-Chun Chiu, Pingtung (TW); Zu-Chiang Gu, Kaohsiung (TW); Po-Hsien Ho, Taipei (TW); Meng-Hsin Chen, Pingtung County (TW); Chih-Hsiang Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 314 days.

(21) Appl. No.: 16/918,551

(22) Filed: Jul. 1, 2020

(65) Prior Publication Data
US 2021/0002554 A1    Jan. 7, 2021

Related U.S. Application Data

(60) Provisional application No. 62/869,669, filed on Jul. 2, 2019.

(30) Foreign Application Priority Data

Apr. 13, 2020   (TW) ................. 109112311

(51) Int. Cl.
*C09K 19/38* (2006.01)
*C08G 63/06* (2006.01)
(Continued)

(52) U.S. Cl.
CPC .......... *C09K 19/3809* (2013.01); *B32B 15/20* (2013.01); *C08G 63/065* (2013.01);
(Continued)

(58) Field of Classification Search
CPC ............ C09K 19/3809; C09K 2019/03; C09K 2323/061; C08J 2367/03; C08G 63/065;
(Continued)

(56) References Cited

U.S. PATENT DOCUMENTS 4,816,885 A   3/1989 Hisgen et al.
6,043,310 A   3/2000 Liu et al.
(Continued)

FOREIGN PATENT DOCUMENTS

CN   101104705 B   10/2010
CN   101423599 B   8/2012
(Continued)

OTHER PUBLICATIONS

Extended European Search Report for European Application No. 20182251.7, dated Dec. 10. 2020.
(Continued)

*Primary Examiner* — Ruiyun Zhang
(74) *Attorney, Agent, or Firm* — Birch, Stewart, Kolasch & Birch, LLP

(57) ABSTRACT

Liquid-crystal polymer is composed of the following repeating units: 10 mol % to 35 mol % of

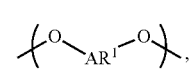
(1)

10 mol % to 35 mol % of

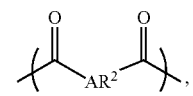
(2)

10 mol % to 50 mol % of

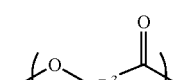
(3)

and 10 mol % to 40 mol % of

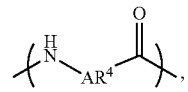
(4a)

10 mol % to 40 mol % of

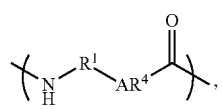
(4b)

or a combination thereof. Each of $AR^1$, $AR^2$, $AR^3$, and $AR^4$ is independently $AR^5$ or $AR^5\text{-}Z\text{-}AR^6$, in which each of $AR^5$ and $AR^6$ is independently (Continued)

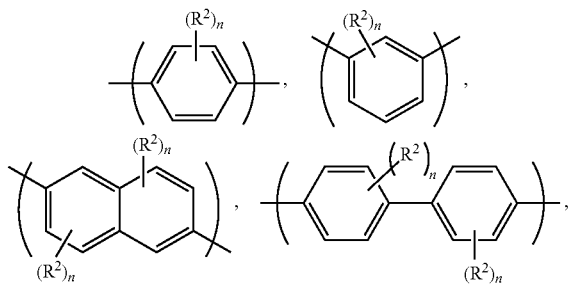

or a combination thereof, and Z is —O—,

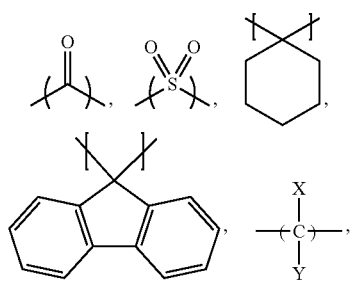

or $C_{1-5}$ alkylene group. Each of X and Y is independently H, $C_{1-5}$ alkyl group, $CF_3$, or

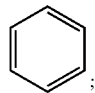

wherein $R^2$ is H, $CH_3$, $CH(CH_3)_2$, $C(CH_3)_3$, $CF_3$, or

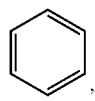

n=1 to 4; and wherein $R^1$ is $C_{1-5}$ alkylene group.

18 Claims, No Drawings

(51) Int. Cl.
*C08G 63/191* (2006.01)
*C08G 63/60* (2006.01)
*C08G 63/688* (2006.01)
*B32B 15/20* (2006.01)
*B32B 7/12* (2006.01)

(52) U.S. Cl.
CPC .......... *C08G 63/191* (2013.01); *C08G 63/605* (2013.01); *C08G 63/6886* (2013.01); *B32B 7/12* (2013.01); *B32B 2305/55* (2013.01); *C08J 2367/02* (2013.01); *C09K 2219/03* (2013.01); *C09K 2323/061* (2020.08)

(58) Field of Classification Search
CPC ................ C08G 63/191; C08G 63/605; C08G 63/6886; B32B 7/12; B32B 2305/55; B32B 15/20
USPC ............................. 428/1.6, 1.61; 252/299.6
See application file for complete search history.

(56) References Cited

U.S. PATENT DOCUMENTS

| | | | |
|---|---|---|---|
| 6,294,640 B1* | 9/2001 | Linstid, III | C08J 5/18 528/190 |
| 6,706,851 B1* | 3/2004 | Linemann | C08L 101/00 525/166 |
| 7,022,807 B2 | 4/2006 | Okamoto et al. | |
| 9,012,593 B2 | 4/2015 | Chang et al. | |
| 2011/0315438 A1 | 12/2011 | Ito et al. | |
| 2014/0284085 A1* | 9/2014 | Kim | H05K 1/056 428/458 |

FOREIGN PATENT DOCUMENTS

| | | | |
|---|---|---|---|
| CN | 103502308 A | 1/2014 | |
| CN | 106633859 A | 5/2017 | |
| CN | 108026270 A | 5/2018 | |
| DE | 35 42 855 A1 | 6/1987 | |
| EP | 1 116 739 A2 | 7/2001 | |
| JP | 61-236819 A | 10/1986 | |
| JP | 62-132927 A | 6/1987 | |
| JP | 2001-200034 A | 7/2001 | |
| JP | 2003-105082 A | 4/2003 | |
| JP | 2014-518915 A | 8/2014 | |
| TW | I243832 B | 11/2005 | |
| TW | 201630966 A | 9/2016 | |
| WO | WO-2015067490 A1 * | 5/2015 | A47J 31/46 |
| WO | WO 2017/068868 A1 | 4/2017 | |
| WO | WO 2020/039878 A1 | 2/2020 | |

OTHER PUBLICATIONS

Taiwanese Office Action and Search Report for Taiwanese Application No. 109112311, dated Apr. 8, 2021.
Japanese Office Action for Japanese No. 2020-113162, dated Nov. 2, 2021, with English translation.
Japanese Office Action for Japanese Application No. 2020-113162, dated Apr. 19, 2022, with English translation.
Romansky et al., "Solvent Interactions with an Insoluble Liquid-Crystalline Polyester", Macromolecules, Jan. 19, 1994, pp. 6297-6300.
Chinese Office Action and Search Report for Chinese Application No. 202010585756.2, dated Jun. 1, 2022.

* cited by examiner

LIQUID-CRYSTAL POLYMER, LAMINATED MATERIAL, LIQUID-CRYSTAL POLYMER SOLUTION, AND METHOD OF FORMING LIQUID-CRYSTAL POLYMER FILM

CROSS REFERENCE TO RELATED APPLICATIONS

This application claims the benefit of U.S. Provisional Application No. 62/869,669 filed on Jul. 2, 2019.

The present application is based on, and claims priority from, Taiwan Application Serial Number 109112311, filed on Apr. 13, 2020, the disclosure of which is hereby incorporated by reference herein in its entirety.

TECHNICAL FIELD

The technical field relates to liquid-crystal polymer.

BACKGROUND

In recent years, liquid-crystal polymer (LCP) has been widely utilized in many high-value, high-end applications, especially in LCP films. Such LCP films have low moisture absorption, low dielectric constant, and low dielectric loss. Moreover, the polyimide (PI) films utilized in flexible copper clad laminate (FCCL) in mobile cell phones cannot satisfy the needs of 4G/5G high speed communication, and the PI films may possibly be replaced with LCP films. However, traditional LCP materials have a high-order molecular alignment, which can easily result in a crystallinity difference between MD and TD directions during the processes of film extrusion and film blowing. As such, the LCP film strength in the MD orientation is high, and the LCP film can easily crack in the TD direction. Accordingly, the thermal processes for preparing LCP films need high-threshold equipments and technologies.

Accordingly, a novel soluble LCP composition is called for, in order for solution-type and film-level LCP to be applied in FCCL product.

SUMMARY

One embodiment of the disclosure provides a liquid-crystal polymer, being composed of the following repeating units: 10 mol % to 35 mol % of

(1)

10 mol % to 35 mol % of

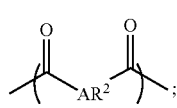

(2)

10 mol % to 50 mol % of

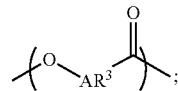

(3)

and 10 mol % to 40 mol % of

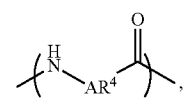

(4a)

10 mol % to 40 mol % of

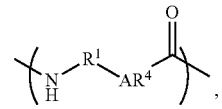

(4b)

or a combination thereof, each of $AR^1$, $AR^2$, $AR^3$, and $AR^4$ is independently $AR^5$ or $AR^5$-Z-$AR^6$, in which each of $AR^5$ and $AR^6$ is independently

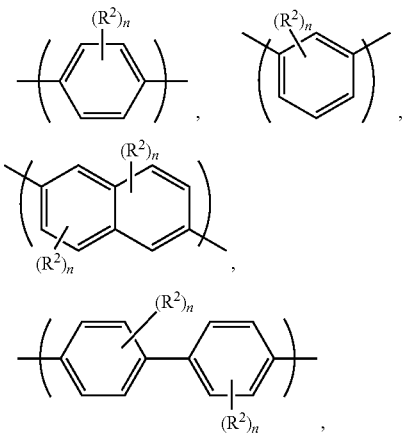

or a combination thereof, and Z is —O—,

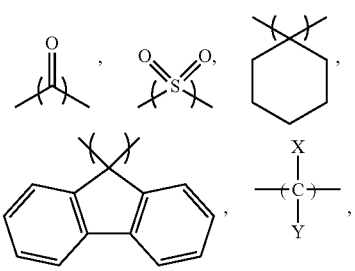

or $C_{1-5}$ alkylene group, wherein each of X and Y is independently H, $C_{1-5}$ alkyl group, $CF_3$, or

, wherein $R^2$ is H, $CH_3$, $CH(CH_3)_2$, $C(CH_3)_3$, $CF_3$, or

, n=1 to 4; and wherein $R^1$ is $C_{1-5}$ alkylene group.

One embodiment of the disclosure provides a laminated material, including a support and a liquid-crystal polymer film disposed on the support, wherein the liquid-crystal polymer film includes the described liquid-crystal polymer.

One embodiment of the disclosure provides a liquid-crystal polymer solution, including 100 parts by weight of solvent and 0.01 to 100 parts by weight of the described liquid-crystal polymer.

One embodiment of the disclosure provides a method of forming liquid-crystal polymer film, including coating the described liquid-crystal polymer solution onto a support and removing the solvent to form a liquid-crystal polymer film on the support.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a liquid-crystal polymer, being composed of the following repeating units: 10 mol % to 35 mol % of

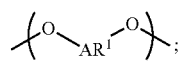 (1)

10 mol % to 35 mol % of

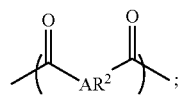 (2)

10 mol % to 50 mol % of

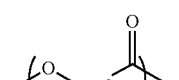 (3)

and 10 mol % to 40 mol % of

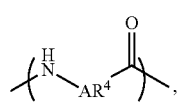 (4a)

10 mol % to 40 mol % of

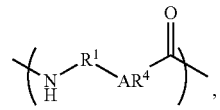 (4b)

or a combination thereof. For example,

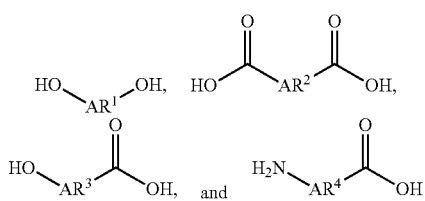

can be reacted to form a liquid-crystal polymer. On the other hand,

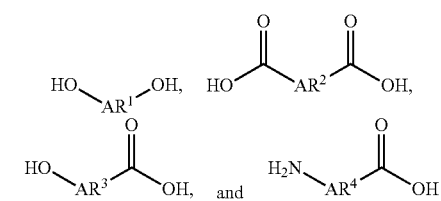

can be reacted to form a liquid-crystal polymer. Alternatively,

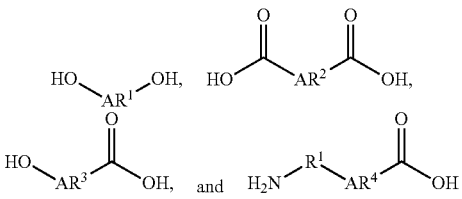

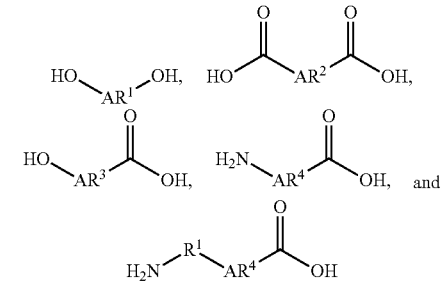

can be reacted to form a liquid-crystal polymer.

have a molar ratio of 1:1. If

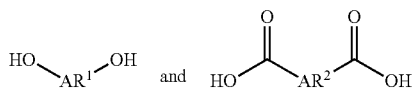 and 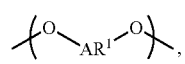

have a molar ratio of greater than or less than 1, excessive

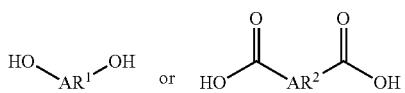

cannot be reacted to copolymerize.

Each of AR$^1$, AR$^2$, AR$^3$, and AR$^4$ is independently AR$^5$ or AR$^5$-Z-AR$^6$, in which each of AR$^5$ and AR$^6$ is independently

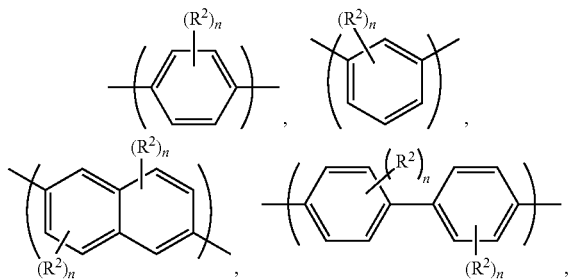

or a combination thereof, and Z is —O—,

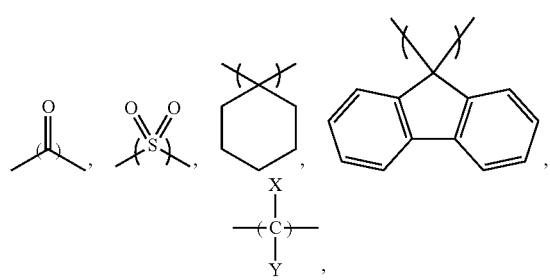

or C$_{1-5}$ alkylene group, wherein each of X and Y is independently H, C$_{1-5}$ alkyl group, CF$_3$, or

wherein R$^2$ is H, CH$_3$, CH(CH$_3$)$_2$, C(CH$_3$)$_3$, CF$_3$, or

n=1 to 4; and wherein R$^1$ is C$_{1-5}$ alkylene group. In the liquid-crystal polymer, if the content of (1)

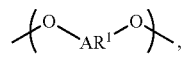

such as

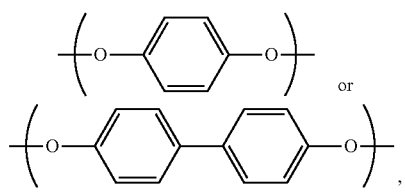

is too low, the crystallinity of the liquid-crystal polymer will be degraded. If the content of (1)

such as

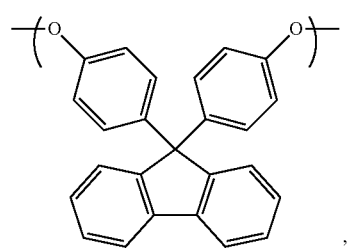

is too low, the solubility of the liquid-crystal polymer will be degraded. If the content of (1)

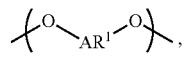

such as

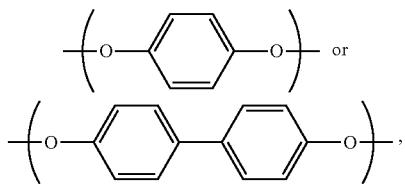

is too high, the solubility of the liquid-crystal polymer will be degraded. If the content of (1)

such as

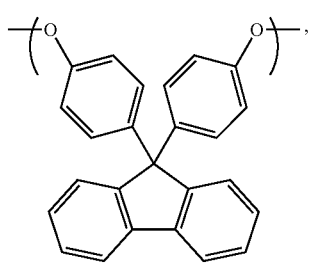

is too high, the crystallinity of the liquid-crystal polymer will be degraded. If the content of (2)

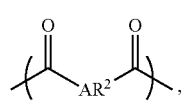

such as

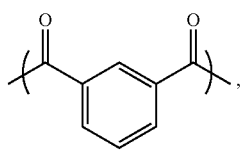

is too low, the solubility of the liquid-crystal polymer will be lowered. If the content of (2)

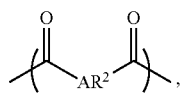

such as

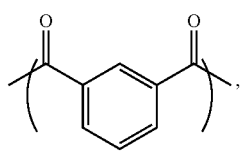

is too high, the crystallinity of the liquid-crystal polymer will be degraded. If the content of (3)

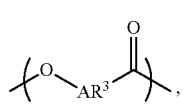

such as

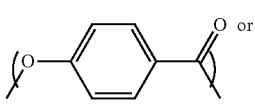

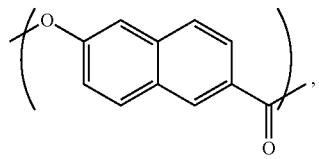

is too low, the crystallinity of the liquid-crystal polymer will be degraded. If the content of (3)

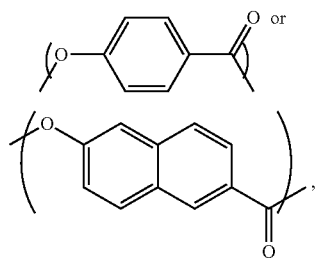

such as

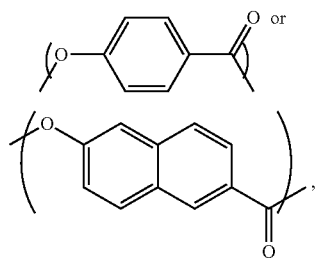

is too high, the solubility of the liquid-crystal polymer will be degraded. If the content of (4a)

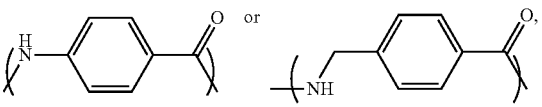

(4b)

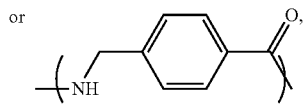

or a combination thereof, such as

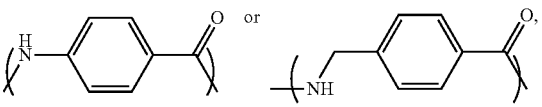

is too low, the solubility of the liquid-crystal polymer will be degraded. If the content of (4a)

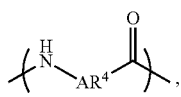

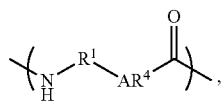

or a combination thereof, such as

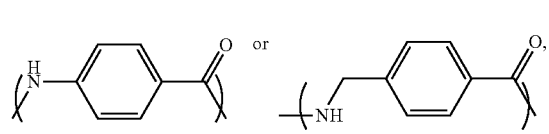

is too high, the dielectric properties of the liquid-crystal polymer will be degraded, the crystallinity of the liquid-crystal polymer will be degraded, or the liquid-crystal polymer cannot be successfully polymerized.

In some embodiments,

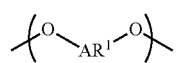

is

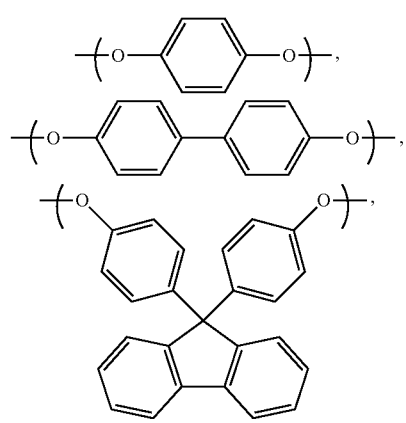

or a combination thereof. In some embodiments,

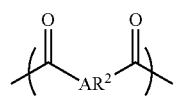

is

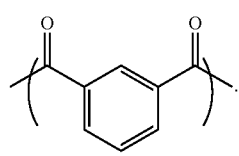

In some embodiments,

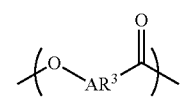

is

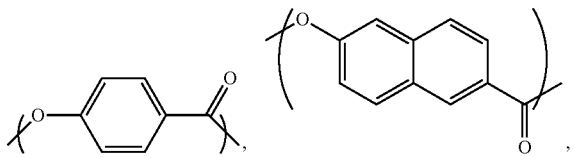

or a combination thereof. In some embodiments,

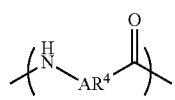

is

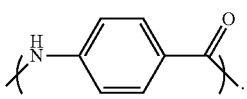

In some embodiments,

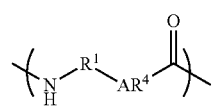

is

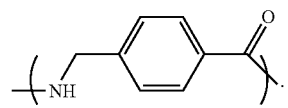

In some embodiments, the liquid-crystal polymer is composed of the following repeating units: 15 mol % to 35 mol % of

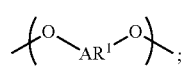

15 mol % to 35 mol % of

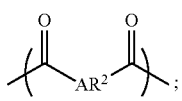

(2)

15 mol % to 35 mol % of

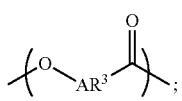

(3)

and 10 mol % to 40 mol % of

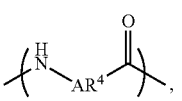

(4a)

10 mol % to 40 mol % of

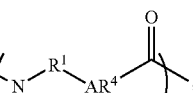

(4b)

or a combination thereof. The definitions of $AR^1$, $AR^2$, $AR^3$, and $AR^4$ are similar to those described above, and the related description is not repeated here.

In some embodiments, the liquid-crystal polymer has a weight average molecular weight (Mw) of 1,000 g/mol to 1,000,000 g/mol. If the Mw of the liquid-crystal polymer is too low, the film formability of the liquid-crystal polymer will be degraded. If the Mw of the liquid-crystal polymer is too high, the solubility of the liquid-crystal polymer will be degraded.

The method of manufacturing the liquid-crystal polymer of the disclosure is not specifically limited. For example, the hydroxyl-containing monomer or amine-containing monomer is firstly reacted with excess amount of fatty acid anhydride to perform acylation to form an acylated compound. The acylated compound is reacted with carboxylic acid-containing monomer to perform transesterification to form the liquid-crystal polymer. Alternatively, the acylated compound that is pre-acylated can be reacted with the carboxylic acid-containing monomer to perform the transesterification to form the liquid-crystal polymer.

The fatty acid anhydride content in the acylation can be 1.0 to 1.2 times total equivalent of the hydroxyl group and amine group. The acylation can be performed at 130° C. to 180° C. for 5 minutes to 10 hours, such as 140° C. to 160° C. for 10 minutes to 3 hours.

The fatty acid anhydride for the acylation in the disclosure is not specifically limited and may include acetic anhydride, propionic anhydride, butanoic anhydride, isobutanoic anhydride, pentanoic acid, trimethylacetic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, the like, or a combination thereof. In some embodiments, the fatty acid anhydride can be acetic anhydride, propionic anhydride, butanoic anhydride, or isobutanoic anhydride.

A catalyst can be added into the acylation and the transesterification. The catalyst can be a known catalyst for polymerization of polyester, such as metal salt catalyst (e.g. magnesium acetate, tin acetate, tetrabutyl titanate, lead acetate, potassium acetate, antimony trioxide, or the like), or organic catalyst such as heterocyclic compound having at least two nitrogen atoms (e.g. N, N'-dimethylaminopyridine, N-methylimidazole, pyrazole, or the like).

An additive can be added into the acylation reaction and the transesterification reaction, and the specific additive those are known in the art includes binding agent, anti-precipitation agent, UV absorber, thermal stabilizer, anti-oxidant, or a combination thereof.

The aromatic liquid-crystal polymer can be manufactured by batch-type equipment, continuous-type equipment, or the like.

The liquid-crystal polymer can be dissolved in a solvent to form a liquid-crystal polymer solution. The solvent and the liquid-crystal polymer may have a weight ratio of 100:0.01 to 100:100. For example, the liquid-crystal polymer solution may contain 100 parts by weight of the solvent and 0.01 to 100 parts by weight of the liquid-crystal polymer. In one embodiment, the crystal liquid solution contains 100 parts by weight of the solvent and 1 to 70 parts by weight of the liquid-crystal polymer. Alternatively, the liquid-crystal polymer solution contains 100 parts by weight of the solvent and 1 to 10 parts by weight of the liquid-crystal polymer. If the amount of the liquid-crystal polymer is too low, the coated film cannot achieve a thicker thickness. If the amount of the liquid-crystal polymer is too high, the solution viscosity will be too high to be coated. The liquid-crystal polymer is similar to that described above, and the related description is not repeated here. For example, the solvent can be halogen-containing solvent (such as 1-chlorobutane, chlorobenzene, 1,1-dichloroethane, chloroform, or 1,1,2,2-tetrachloroethane), ether solvent (such as diethyl ether, tetrahydrofuran, or 1,4-dioxolane), ketone solvent (such as acetone or cyclohexanone), ester solvent (such as ethyl acetate), lactone solvent (such as butyl acrylate), carbonate solvent (such as vinyl carbonate or acrylic carbonate), amine solvent (such as triethylamine or pyridine), nitrile solvent (such as acetonitrile), amide solvent (such as N, N'-dimethylformamide, N, N'-dimethylacetamide, tetramethylurea, or N-methylpyrrolidone), nitro solvent (such as nitromethane or nitrobenzene), sulfide solvent (such as dimethyl sulfoxide or butane disulfone), phosphide solvent (hexamethyl phosphoric triamide or tri-n-butyl phosphide), paraffin, olefin, alcohol, aldehyde, aromatic hydrocarbon, terpene, hydrogenated hydrocarbon, heterocyclic compound, or a combination thereof. The liquid-crystal polymer solution may further include another resin. For example, at least one resin that is not the liquid-crystal polymer can be added to the liquid-state composition. The resin may include thermoplastic resin or thermosetting resin. The thermoplastic resin can be polypropylene, polyamide, polyester (such as non-liquid-crystal polyallylate), polyphenylene sulfide, polyetherketone, polycarbonate, polyether sulfone, polyphenylene ether, polyetherimide, fluororesin, an elastomer (typically, copolymer of glycidyl methacrylate and polyethylene), or a modified product thereof. The thermosetting resin can be novolac resin, epoxy resin, polyimide resin, or cyanate resin. In addition, the other resin can be dissolved in the solvent for the liquid-crystal polymer when the other solvent is adopted. In addition, the liquid-crystal polymer solution may further include another additive to enhance the size stability, mechanical properties, thermal conductivity, dielectric properties, thermal stability, light stability, anti-aging properties, coatability, and film formability. The additive may include inorganic filler (e.g. silica, alumina, titania, zirconia, hydrous aluminum silicate, calcium carbonate, calcium phosphate, barium titanate, strontium titanate, or aluminum hydroxide), organic filler (e.g. epoxy resin powder, melamine resin powder, polyurea resin powder, benzomelamine formaldehyde resin powder, styrene resin powder, fluororesin powder, or fluororesin dispersion), anti-oxidant, UV absorber, thermal stabilizer, light stabilizer, anti-aging agent, toughening agent, plasticizer, crosslinking agent, additives for coating inks (e.g. defoamer, leveling agent, wetting and dispersing agent, thickener, thixotropy controller, adhesion promoter, or coupling agent), or a combination thereof.

The liquid-crystal polymer film can be prepared by the following method. First, the described liquid-crystal polymer solution is coated onto a support to be flat and uniform. The coating method can be any suitable method such as roll coating, dip coating, spray coating, spin-on coating, curtain coating, slot coating, or screen coating. The support can be copper foil, glass, aluminum foil, or another suitable support. After coating the liquid-crystal polymer solution, the solvent is removed to form the liquid-crystal polymer film on the support. The support can be then optionally removed (depending on the application requirement) by the method such as etching or peeling.

The method of removing the solvent is not specifically limited, which can be evaporation. The solvent can be evaporated by heating, reducing pressure, ventilation, or the like. In the above methods, the heating evaporation is beneficial in high yield and easy operation. On the other hand, the coating can be heated in ventilation to evaporate the solvent. For example, the coating can be pre-heated in ventilation at 60° C. to 200° C. for being dried for about 10 minutes to 2 hours, and then heated in ventilation at 200° C. to 400° C. for about 30 minutes to 10 hours.

The thickness of the liquid-crystal polymer film prepared by the above method is not limited, which can be 1 micrometer to 100 micrometers.

One embodiment of the disclosure provides a laminated material, including the support and the liquid-crystal polymer film on the support. The support can be copper foil, glass, aluminum foil, or another suitable support. In some embodiments, the laminated material includes the copper foil and the liquid-crystal polymer film on the copper foil. An adhesive layer can be further disposed between the support (e.g. copper foil) and the liquid-crystal polymer film to enhance the adhesion between the support (e.g. copper foil) and the liquid-crystal polymer film. When the laminated material is applied to the printed circuit board, some adhesive having excellent electric properties (e.g. fluororesin) can be introduced to reduce the transmission loss of the printed circuit board. The laminated material can be further manufactured as a laminated material with double-sided copper foils. For example, the laminated materials with single-sided copper foil can be attached to each other and heat pressed to form a laminated material with double-sided copper foils, in which a middle layer of the liquid-crystal polymer film is interposed between a top layer of the copper foil and a bottom layer of the copper foil.

An appropriate ratio of

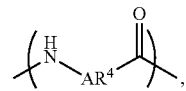

(4a)

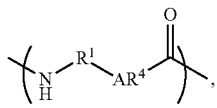

(4b)

or a combination thereof is introduced into the liquid-crystal polymer to combine with an appropriate ratio of

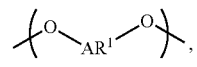

(1)

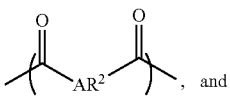

(2)

, and

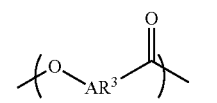

(3)

to efficiently enhance the solubility of the liquid-crystal polymer, enhance the thermal properties (e.g. thermal decomposition temperature (Td), glass transition temperature (Tg), and melting point (Tm)) of the liquid-crystal polymer, lower the dielectric constant of the liquid-crystal polymer film, and lower the dielectric loss of the liquid-crystal polymer film.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

81.75 g of 4-aminophenol (0.75 mole), 155.25 g of 4-hydroxybenzoic acid (1.125 mole), 70.5 g of 6-hydroxy-2-naphthalene carboxylic acid (0.375 mole), 124.5 g of isophthalic acid (0.75 mole), and 306 g of acetic anhydride (3.0 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had weight average molecular weight (Mw) of 4,183 g/mol (measured by gel permeation chromatography, GPC). The product had thermal decomposition temperature (Td) of 398° C. (measured by thermogravimetric analysis, TGA). The product was dissolved in N-methyl-2-pyrrolidone (NMP) to form a solution with a solid content of 8 wt %. The solution was coated onto a copper foil and dried, and then heat treated at 200° C. to 300° C. to obtain a liquid-crystal polyester film (with a thickness of 25 micrometers) attached to the copper foil. The copper foil was then removed by etchant to obtain the liquid-crystal polyester film alone. The liquid-crystal polyester film had glass transition temperature (Tg) of 180° C. and melting point (Tm) of 293° C., which were measured by differential scanning calorimetry (DSC). The film had dielectric constant (Dk) of 3.78 and dielectric loss (Df) of 0.009, which were measured by cavity resonator method at 10 GHz.

In the above reactions, the chemical structure of 4-aminophenol is

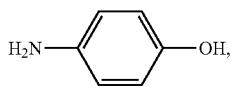

the chemical structure of 4-hydroxybenzoic acid is

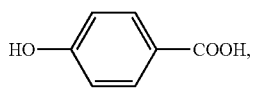

the chemical structure of 6-hydroxy-2-naphthalene carboxylic acid is

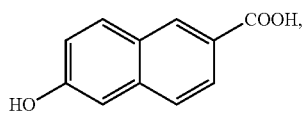

and the chemical structure of isophthalic acid is

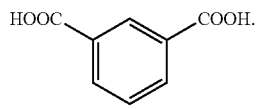

Example 1

51.75 g of 4-hydroxybenzoic acid (0.375 mole), 70.5 g of 6-hydroxy-2-naphthalene carboxylic acid (0.375 mole), 124.5 g of isophthalic acid (0.75 mole), 102.75 g of 4-aminobenzoic acid (0.75 mole), 82.5 g of hydroquinone (0.75 mole), and 306 g of acetic anhydride (3.0 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had Mw of 13,997 g/mol (measured by GPC). The product had Td of 455° C. (measured by TGA). The product was dissolved in NMP to form a solution with a solid content of 8 wt %. The solution was coated onto a copper foil and dried, and then heat treated at 200° C. to 300° C. to obtain a liquid-crystal polymer film (with a thickness of 25 micrometers) attached to the copper foil. The copper foil was then removed by etchant to obtain the liquid-crystal polymer film alone. The liquid-crystal polymer film had Tg of 173° C., which was measured by DSC. The film had Dk of 3.58 and Df of 0.0076, which were measured by cavity resonator method at 10 GHz.

In the above reactions, the chemical structure of 4-aminobenzoic acid is

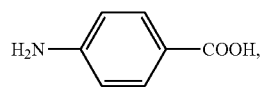

and the chemical structure of hydroquinone is

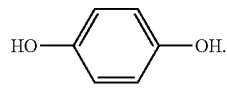

Example 2

48.3 g of 4-hydroxybenzoic acid (0.35 mole), 65.8 g of 6-hydroxy-2-naphthalene carboxylic acid (0.35 mole), 116.2 g of isophthalic acid (0.7 mole), 95.9 g of 4-aminobenzoic acid (0.7 mole), 130.2 g of 4,4'-biphenol (0.7 mole), and 286 g of acetic anhydride (2.8 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had Mw of 84,878 g/mol (measured by GPC). The product had Td of 469° C. (measured by TGA). The product was dissolved in NMP to form a solution with a solid content of 8 wt %. The solution was coated onto a copper foil and dried, and then heat treated at 200° C. to 300° C. to obtain a liquid-crystal polymer film (with a thickness of 25 micrometers) attached to the copper foil. The copper foil was then removed by etchant to obtain the liquid-crystal polymer film alone. The liquid-crystal polymer film had Tg of 181° C. and Tm of 296° C., which were measured by DSC. The film had Dk of 3.59 and Df of 0.007, which were measured by cavity resonator method at 10 GHz.

In the above reactions, the chemical structure of 4,4'-biphenol is

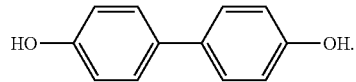 [SMILES: Oc1ccc(-c2ccc(O)cc2)cc1]

Example 3

131.6 g of 6-hydroxy-2-naphthalene carboxylic acid (0.7 mole), 116.2 g of isophthalic acid (0.7 mole), 95.9 g of 4-aminobenzoic acid (0.7 mole), 130.2 g of 4,4'-biphenol (0.7 mole), and 286 g of acetic anhydride (2.8 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had Mw of 16,841 g/mol (measured by GPC). The product had Td of 457° C. (measured by TGA). The product was dissolved in NMP to form a solution with a solid content of 8 wt %. The solution was coated onto a copper foil and dried, and then heat treated at 200° C. to 300° C. to obtain a liquid-crystal polymer film (with a thickness of 25 micrometers) attached to the copper foil. The copper foil was then removed by etchant to obtain the liquid-crystal polymer film alone. The liquid-crystal polymer film had Tg of 183° C. and Tm of 315° C., which were measured by DSC. The film had Dk of 3.58 and Df of 0.0042, which were measured by cavity resonator method at 10 GHz. As shown in comparison between Comparative Example 1 and Examples 1-3, the liquid-crystal polymers those were formed by introduced the 4-aminobenzoic acid had better thermal stability and lower dielectric constant and dielectric loss.

Comparative Example 2

237 g of 6-hydroxy-2-naphthalene carboxylic acid (1.26 mole), 116 g of isophthalic acid (0.7 mole), 20 g of 4-aminobenzoic acid (0.14 mole), 130 g of 4,4'-biphenol (0.7 mole), and 286 g of acetic anhydride (2.8 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had Td of 456° C. (measured by TGA). The product could not be dissolved in NMP to form a solution, such that the product could not be coated as film and analyzed by GPC.

Comparative Example 3

26 g of 6-hydroxy-2-naphthalene carboxylic acid (0.14 mole), 116 g of isophthalic acid (0.7 mole), 173 g of 4-aminobenzoic acid (1.26 mole), 130 g of 4,4'-biphenol (0.7 mole), and 286 g of acetic anhydride (2.8 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed. Product was precipitated during the reaction, the reaction could not be continued, and the product could not be successfully output.

Example 4

131.6 g of 6-hydroxy-2-naphthalene carboxylic acid (0.7 mole), 116 g of isophthalic acid (0.7 mole), 106 g of 4-(aminomethyl)benzoic acid (0.7 mole), 175 g of 9,9-bis(4-hydroxyphenyl)fluorene (0.5 mole), 37.2 g of 4,4'-biphenol (0.2 mole), and 286 g of acetic anhydride (2.8 mole) were mixed, then heated to 150° C. to be reacted at 150° C. for 3 hours under nitrogen, and then heated to 320° C. to be reacted at 320° C. for 1 hour. Thereafter, the temperature was kept at 320° C. and the pressure was gradually vacuumed until the reaction achieved ideal viscosity. The vacuum was then broken by nitrogen, and the product was extruded out by the nitrogen pressure. The product had Mw of 5728 g/mol (measured by GPC). The product had Td of 358° C. (measured by TGA). The product was dissolved in NMP to form a solution with a solid content of 40 wt %. Accordingly, the 4-(aminomethyl)benzoic acid could be introduced to manufacture the liquid-crystal polymer with high solubility, which is beneficial to manufacture a thicker liquid-crystal polymer film. In the above reaction, the chemical structure of 4-(aminomethyl)benzoic acid is

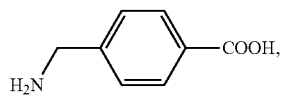

and the chemical structure of 9,9-bis(4-hydroxyphenyl)fluorine is

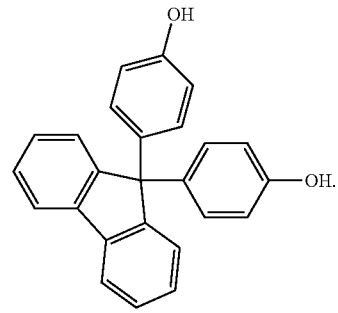 [SMILES: Oc1ccc(C2(c3ccc(O)cc3)c3ccccc3-c3ccccc32)cc1]

It will be apparent to those skilled in the art that various modifications and variations can be made to the disclosed methods and materials. It is intended that the specification and examples be considered as exemplary only, with the true scope of the disclosure being indicated by the following claims and their equivalents.

The invention claimed is:
1. A liquid-crystal polymer, being consisting of the following repeating units:
10 mol % to 35 mol % of

(1)

10 mol % to 35 mol % of

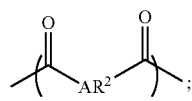
(2)

10 mol % to 25 mol % of

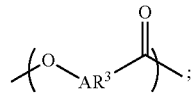
(3)

and 10 mol % to 40 mol % of

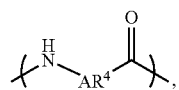 (4a)

10 mol % to 40 mol % of (4b)

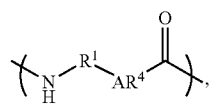 (4b)

or a combination thereof, wherein each of $AR^1$, $AR^2$, $AR^3$, and $AR^4$ is independently $AR^5$ or $AR^5$-Z-$AR^6$, in which each of $AR^5$ and $AR^6$ is independently

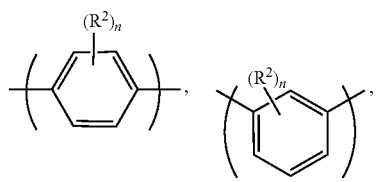

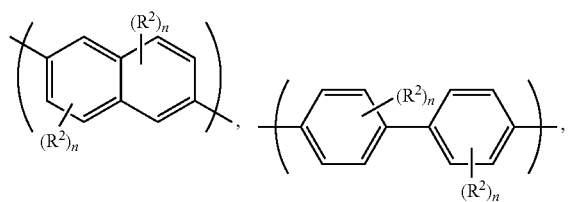

or a combination thereof, and Z is —O—,

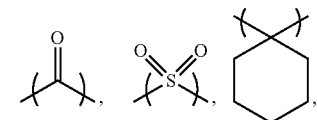

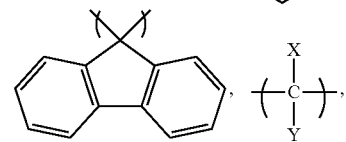

or $C_{1-5}$ alkylene group, wherein each of X and Y is independently H, $C_{1-5}$ alkyl group, $CF_3$, or

wherein $R^2$ is H, $CH_3$, $CH(CH_3)_2$, $C(CH_3)_3$, $CF_3$, or

n=1 to 4; and wherein $R^1$ is $C_{1-5}$ alkylene group.

2. The liquid-crystal polymer as claimed in claim 1, wherein (1)

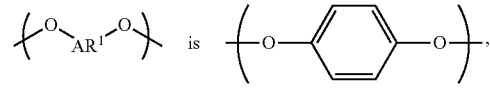 is 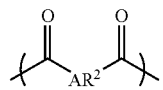,

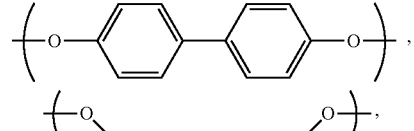

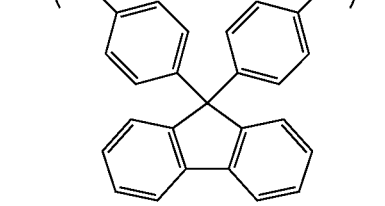

or a combination thereof.

3. The liquid-crystal polymer as claimed in claim 1, wherein (2)

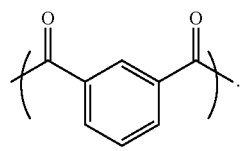

is (image of 1,3-benzenedicarbonyl group)

4. The liquid-crystal polymer as claimed in claim 1, wherein (3)

(image showing $-O-AR^3-C(=O)-$ group)

is

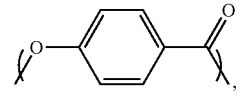,

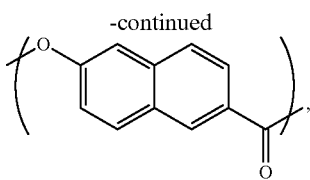

or a combination thereof.

5. The liquid-crystal polymer as claimed in claim 1, wherein (4a)

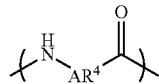

is

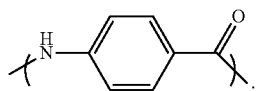

6. The liquid-crystal polymer as claimed in claim 1, wherein (4b)

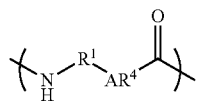

is

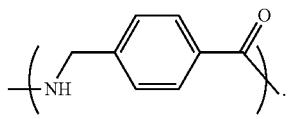

7. The liquid-crystal polymer as claimed in claim 1, having a weight average molecular weight (Mw) of 1,000 to 1,000,000.

8. A laminated material, comprising:
   a support; and
   a liquid-crystal polymer film disposed on the support, wherein the liquid-crystal polymer film includes the liquid-crystal polymer as claimed in claim 1.

9. The laminated material as claimed in claim 8, wherein the liquid-crystal polymer film has a thickness of 1 micrometer to 100 micrometers.

10. The laminated material as claimed in claim 8, wherein the support comprises copper foil, glass, or aluminum foil.

11. The laminated material as claimed in claim 8, further comprising an adhesive layer disposed between the support and the liquid-crystal polymer film.

12. A liquid-crystal polymer solution, comprising:
    100 parts by weight of solvent; and
    0.01 to 100 parts by weight of the liquid-crystal polymer as claimed in claim 1.

13. The liquid-crystal polymer solution as claimed in claim 12, wherein the solvent comprises halogen-containing solvent, ether solvent, ketone solvent, ester solvent, carbonate solvent, amine solvent, nitrile solvent, amide solvent, nitro solvent, sulfide solvent, phosphide solvent, paraffin, olefin, alcohol, aldehyde, aromatic hydrocarbon, terpene, hydrogenated hydrocarbon, heterocyclic compound, or a combination thereof.

14. The liquid-crystal polymer solution as claimed in claim 12, further comprising another resin, and the other resin comprises thermoplastic resin or thermosetting resin.

15. The liquid-crystal polymer solution as claimed in claim 12, further comprising an additive, and the additive comprises inorganic filler, organic filler, anti-oxidant, UV absorber, thermal stabilizer, light stabilizer, anti-aging agent, toughening agent, plasticizer, crosslinking agent, additives for coating inks, or a combination thereof.

16. A method of forming liquid-crystal polymer film, comprising:
    coating the liquid-crystal polymer solution as claimed in claim 12 onto a support; and
    removing the solvent to form a liquid-crystal polymer film on the support.

17. The method as claimed in claim 16, wherein the support comprises copper foil, glass, or aluminum foil.

18. The method as claimed in claim 16, further comprising removing the support after forming the liquid-crystal polymer film on the support.

* * * * *